(12) United States Patent
Milligan et al.

(10) Patent No.: US 7,805,565 B1
(45) Date of Patent: Sep. 28, 2010

(54) VIRTUALIZATION METADATA PROMOTION

(75) Inventors: Charles Milligan, Golden, CO (US); Dawn Hill, Becker, MN (US); Ramesh Panuganty, Sunnyvale, CA (US)

(73) Assignee: Oracle America, Inc., Redwood Shores, CA (US)

( * ) Notice: Subject to any disclaimer, the term of this patent is extended or adjusted under 35 U.S.C. 154(b) by 191 days.

(21) Appl. No.: 11/317,137

(22) Filed: Dec. 23, 2005

(51) Int. Cl.
*G06F 12/00* (2006.01)

(52) U.S. Cl. ............... 711/114; 711/206; 711/203; 707/999.001; 707/999.01; 707/999.107; 707/999.2; 707/999.202; 707/999.204; 710/5

(58) Field of Classification Search ........... 711/114, 711/203, 206; 707/999.001, 999.01, 999.107, 707/999.2, 999.202, 999.204; 710/5
See application file for complete search history.

(56) References Cited

U.S. PATENT DOCUMENTS

| | | | |
|---|---|---|---|
| 6,532,527 | B2 | 3/2003 | Selkirk et al. |
| 6,804,755 | B2 | 10/2004 | Selkirk et al. |
| 6,839,740 | B1 | 1/2005 | Kiselev |
| 6,898,670 | B2 | 5/2005 | Nahum |
| 6,907,419 | B1 | 6/2005 | Pesola et al. |
| 6,912,537 | B2 | 6/2005 | Selkirk et al. |
| 7,236,987 | B1 * | 6/2007 | Faulkner et al. .......... 707/104.1 |
| 2001/0056525 | A1 | 12/2001 | Selkirk et al. |
| 2002/0056031 | A1 | 5/2002 | Skiba et al. |
| 2002/0188711 | A1 | 12/2002 | Meyer et al. |
| 2003/0195887 | A1 | 10/2003 | Vishlitzky et al. |
| 2004/0083404 | A1 | 4/2004 | Subramaniam et al. |
| 2004/0153844 | A1 | 8/2004 | Ghose et al. |
| 2004/0268070 | A1 | 12/2004 | Hasegawa |
| 2005/0015685 | A1 | 1/2005 | Yamamoto |
| 2006/0179170 | A1 * | 8/2006 | Kodama .................. 710/8 |
| 2007/0006226 | A1 * | 1/2007 | Hendel .................... 718/1 |

* cited by examiner

*Primary Examiner*—Tuan V Thai
*Assistant Examiner*—Midys Rojas
(74) *Attorney, Agent, or Firm*—Brooks Kushman P.C.

(57) ABSTRACT

A method for storing digital data in a virtualization storage system which includes the step of creating a virtual storage volume and communicating the location of the virtual storage volume to a storage subsystem. The storage subsystem identifies a mapping type between the virtual volume and at least one virtual volume-related physical device and then creates virtualization metadata describing the virtual volume, the mapping type, and the virtual volume-related physical device. The storage subsystem mediates the storing of at least a portion of the virtualization metadata on the virtual volume-related physical device as device stored metadata. A portion of the stored virtualization metadata is provided to then one or more using systems which utilize this metadata to update the virtual volume information contained therein. A virtualization storage system implements one or more steps of the methods of the invention.

18 Claims, 10 Drawing Sheets

VIRTUALIZATION METADATA PROMOTION

BACKGROUND OF THE INVENTION

1. Field of the Invention

The present invention is related to digital storage virtualization; and in particular, the present invention is related to a method of digital storage virtualization recovery.

2. Background Art

In the case of storage virtualization where the virtualization engine is unresponsive it is a problem to identify which individual real devices or pieces of media contains the requested data. Current solutions to this problem are to provide the virtualization database information to a substitute virtualization engine. The problem with this approach is the amount of time needed to set up the alternative engine in total as well as the expense of maintaining possibly underutilized additional equipment. Moreover, the set-up of the alternative virtualization engine might also fail.

Accordingly there exists a need for improved methodology in storage virtualization for recovery from non-responsive conditions.

SUMMARY OF THE INVENTION

The present invention solves one or more problems of the prior art by providing, in one embodiment, a method for storing digital data in a virtualization storage system. The digital storage system of this embodiment includes one or more using systems, a storage subsystem, and one or more physical storage devices. The using systems typically have virtual volume mappings. The method of this embodiment includes the step of creating a virtual storage volume and communicating the location of the virtual storage volume to the storage subsystem. The storage subsystem identifies a mapping type between the virtual volume and at least one virtual volume-related physical device and then creates virtualization metadata describing the virtual volume, the mapping type, and the virtual volume-related physical device. The storage subsystem mediates the storing of at least a portion of the virtualization metadata on the virtual volume-related physical device as device stored metadata. Also, at least a portion of the stored virtualization metadata is provided to one or more using systems which utilize this metadata to update the virtual volume information contained therein. This latter step is advantageous in that it allows the using system to make subsequent direct access to the at least one virtual volume related physical device if necessary.

In another embodiment of the present invention, a virtualization storage system that implements the methods set forth above is provided. The virtualization storage system of this embodiment comprises one or more physical storage devices and a storage subsystem operable implement one or more steps of the methods of the invention.

DETAILED DESCRIPTION OF THE PREFERRED EMBODIMENT(S)

Reference will now be made in detail to presently preferred compositions or embodiments and methods of the invention, which constitute the best modes of practicing the invention presently known to the inventors.

As used herein, a storage subsystem is a collection of storage related components (controllers and devices) to allow permanent or temporary storage of data. Examples of storage subsystems include disk virtualization systems such as the StorageTek-Sun SVA, tape virtualization systems such as StorageTek-Sun VSM product, multilevel hierarchy (HSM or ASM) systems using disk, disk and tape, disk and optical disk, or any combination of disk, tape, optical, magneto-optical, holographic, solid state, nano-devices, or multi-media storage systems using automated libraries of devices and/or storage media, non-automated management systems of removable media and devices possibly sent to remote locations, and combinations thereof.

In one embodiment the present invention teaches a method for storing digital data in a virtualization storage system. The digital storage system of this embodiment includes one or more using systems, a storage subsystem, and one or more physical storage devices. The using systems typically have virtual volume mappings. The method of this embodiment includes the step of creating a virtual storage volume and communicating the location of the virtual storage volume to the storage subsystem. The storage subsystem identifies a mapping type between the virtual volume and at least one virtual volume-related physical device and then creates virtualization metadata describing the virtual volume, the mapping type, and the virtual volume-related physical device. The storage subsystem mediates association of at least a portion of the virtualization metadata on the virtual volume-related physical device. In a variation, this association is established by storing at least a portion of the virtualization metadata on the virtual volume-related physical device as device stored metadata. In another variation, this association is accomplished by placing the metadata on an accompanying physical device that is known to or specified to relate or can be algorithmically or causally identified to relate. Also, at least a portion of the stored virtualization metadata is provided to then one or more using systems which utilize this metadata to update the virtual volume information contained therein. This latter step is advantageous in that it allows the using system to make subsequent direct access to the at least one virtual volume related physical device if necessary. Moreover, this last step allows the using systems to re-drive the input/output ("I/O") operations when the virtual mapping of the storage subsystems become damaged or inoperable without the need of the storage subsystems to rebuild its virtual mapping.

Figure 1:
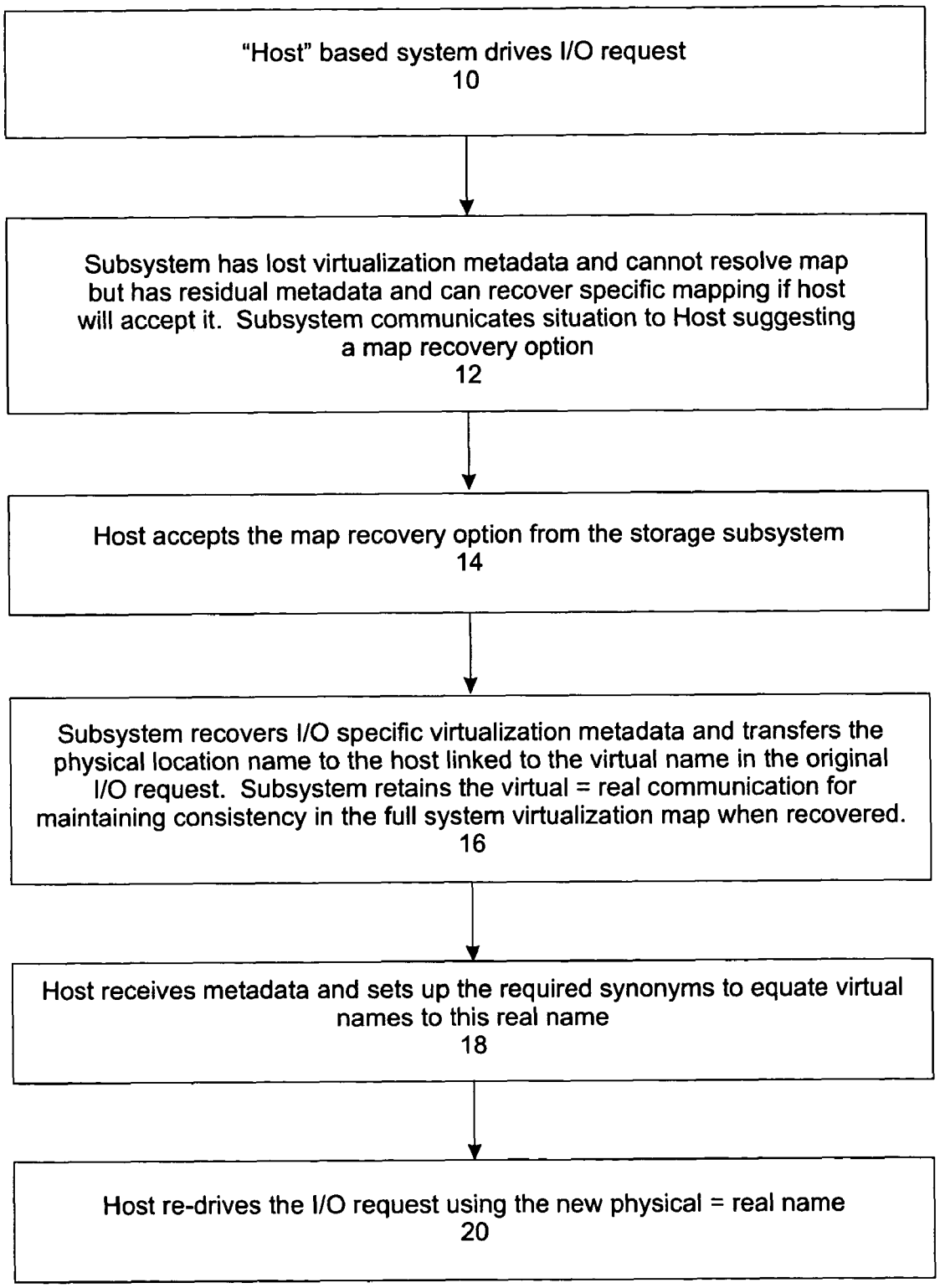
FIG. 1 is a flow chart illustrating a problem solved by the present embodiment of the invention.
Figure 2:
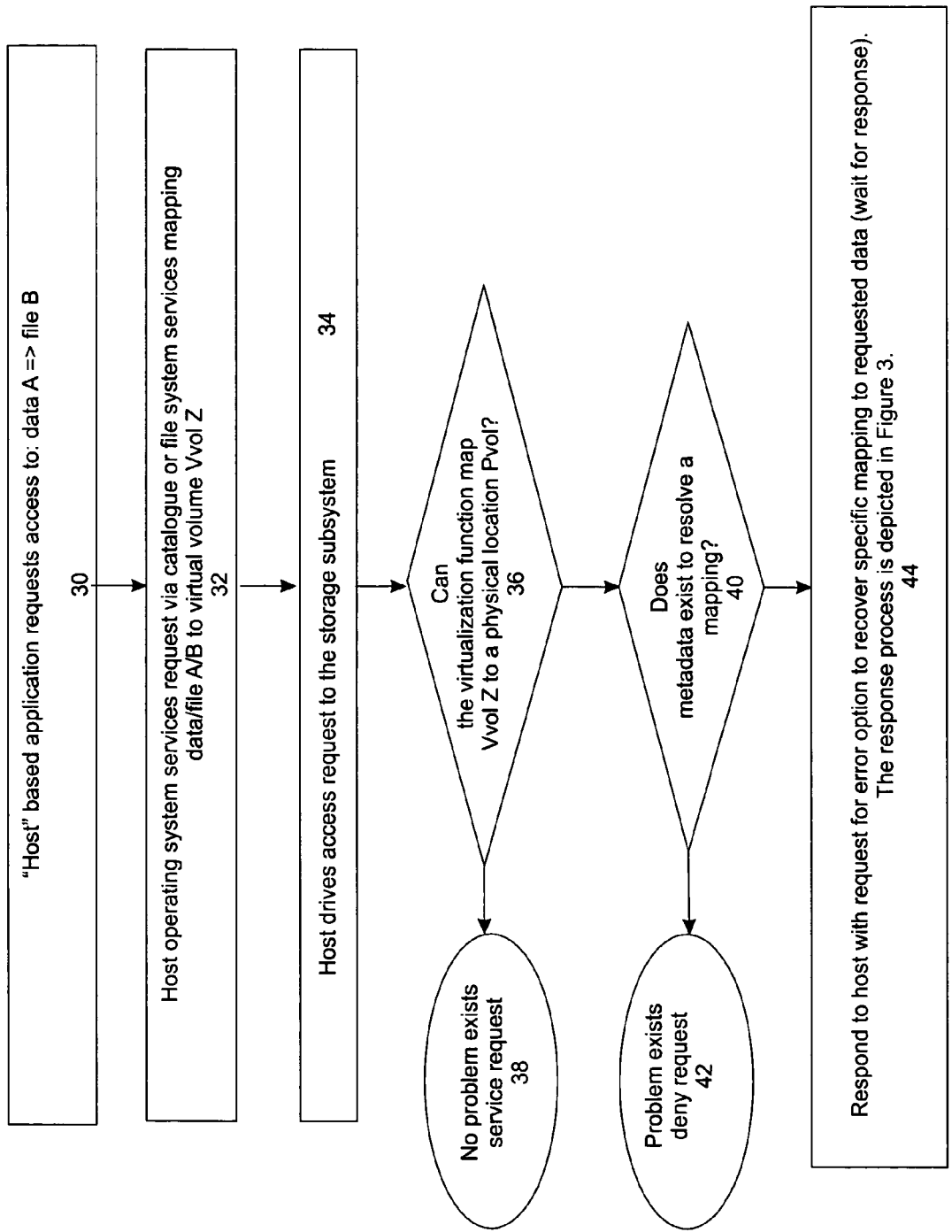
FIG. 2 is a flowchart illustrating the situation when the virtualization function is not able to map a virtual volume to a physical location.
Figure 3:
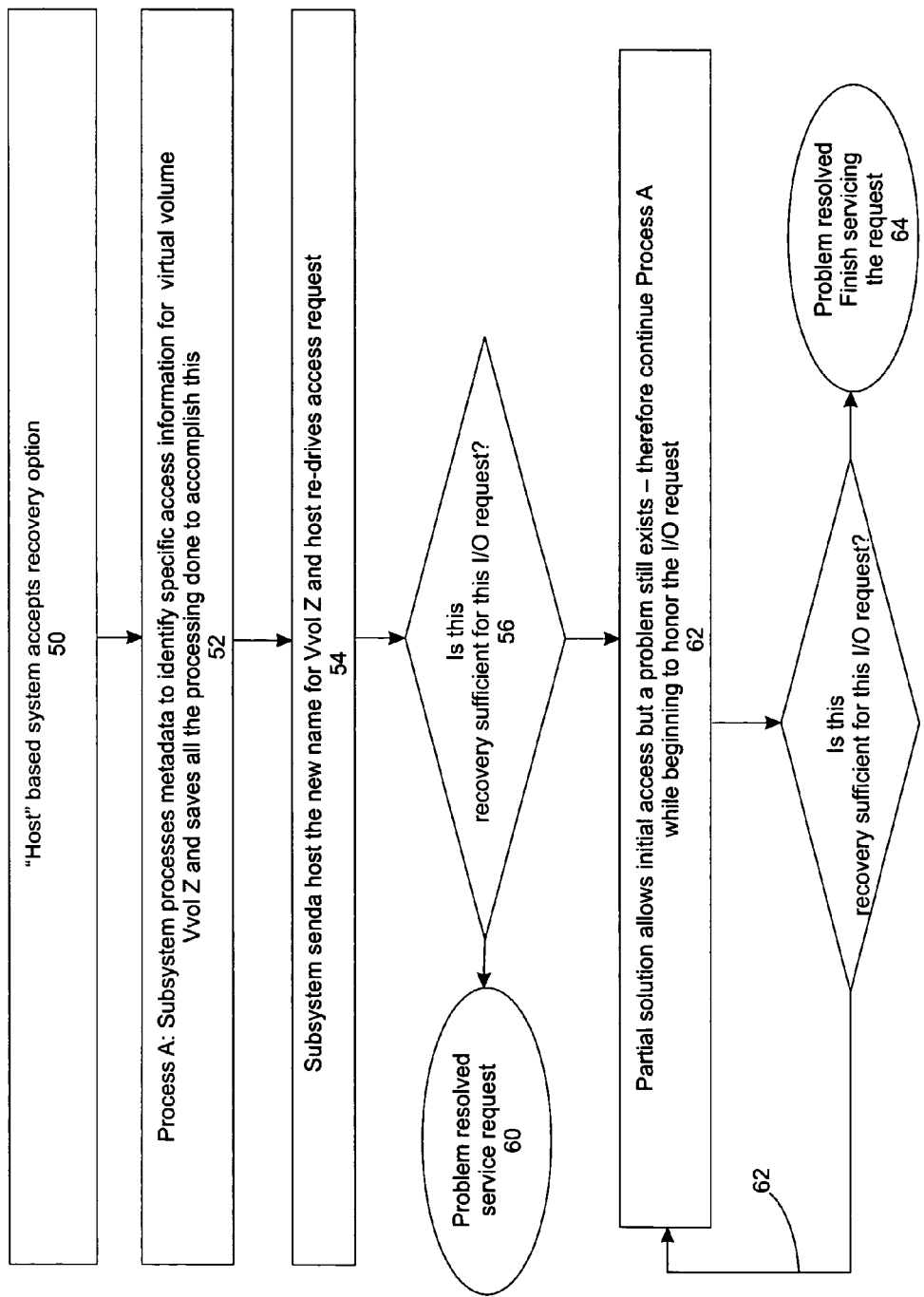
FIG. 3 is a flowchart illustrating the response to the problem of FIG. 2.

The present invention is understood by reference to FIGS. 1, 2, and 3. FIG. 1 is a flow chart illustrating solution of a non-responsive virtualization solved by the present embodiment of the invention. A "host" base system drives an I/O request as shown in box 10. As used herein, host will refer to any using system that accesses a virtual volume. Such using systems include applications, host computers, servers, network nodes, and the like. In box 12, the storage subsystem has lost virtualization metadata and cannot resolve the virtualization mapping. However, the subsystem has residual metadata and can recover specific mapping if the host will accept it. The storage subsystem communicates the situation to the host suggesting a map recovery option. The host accepts the map recovery option in box 14. The storage subsystem recovers I/O specific virtualization metadata and transfers the physical location name to the host linked to the virtual name in the original I/O request (box 16). Typically, the subsystem retains the virtual to real communication for maintaining consistency in the full system virtualization map when recovered. Next, the host receives metadata and sets up the required synonyms to equate virtual names to the real name (box 18). Finally, the using system re-drives the I/O request thereby directly accessing the physical device related to the virtual mapping (box 20).

With reference to FIGS. 2 and 3, a schematic illustrating the solution of a second problem by the present invention is provided. FIG. 2 is a flowchart illustrating the situation when the virtualization function is not able to map a virtual volume to a physical location. In box 30, a using system requests access to data A which is contained in file B. The host operating system will receive a service request from a catalogue or file system service that in turn has mapped the location of data A into file B which was then stored in a location that is understood by these systems to be part of an allocation in virtual volume Z (Vvol Z) (box 32). Next, the host drives access request to the storage subsystem (box 34). At decision box 36, a determination is made as to whether or not the virtualization function can map the virtual volume to physical location (Pvol). If the determination is that such a mapping is possible then there is no problem (item 38). If such a mapping is not possible then decision box 40 is reached at which a determination as to whether or not there is metadata that resolves the mapping. If the determination is that it does not, then an unresolvable problem exists (box 42). If the determination is that such a resolution is possible then the subsystem responds to host with request for error option to recover specific mapping to requested data (wait for response) (Box 44). FIG. 3 provides a flowchart illustrating the response process. In box 50, the host based system accepts the recovery option. The subsystem processes metadata to identify specific access information for virtual volume Vvol Z and saves all the processing done to accomplish this (box 52). In box 54, the subsystem sends a host the new name for Vvol Z allowing the host to re-drive the access request. At decision box 56, a determination is made whether or not the recovery strategy of boxes 52 and 54 is sufficient to successfully re-drive the I/O request. If the determination is affirmative, the problem is resolved (item 60). If the determination is negative, although the partial solution allows initial access (box 52 and box 54), a problem still exists. Therefore, the process of box 52 is continued while beginning to honor the I/O request. This is iteratively continued as indicated by loop 62 until the problem is resolved (item 64).

Figure 4A:
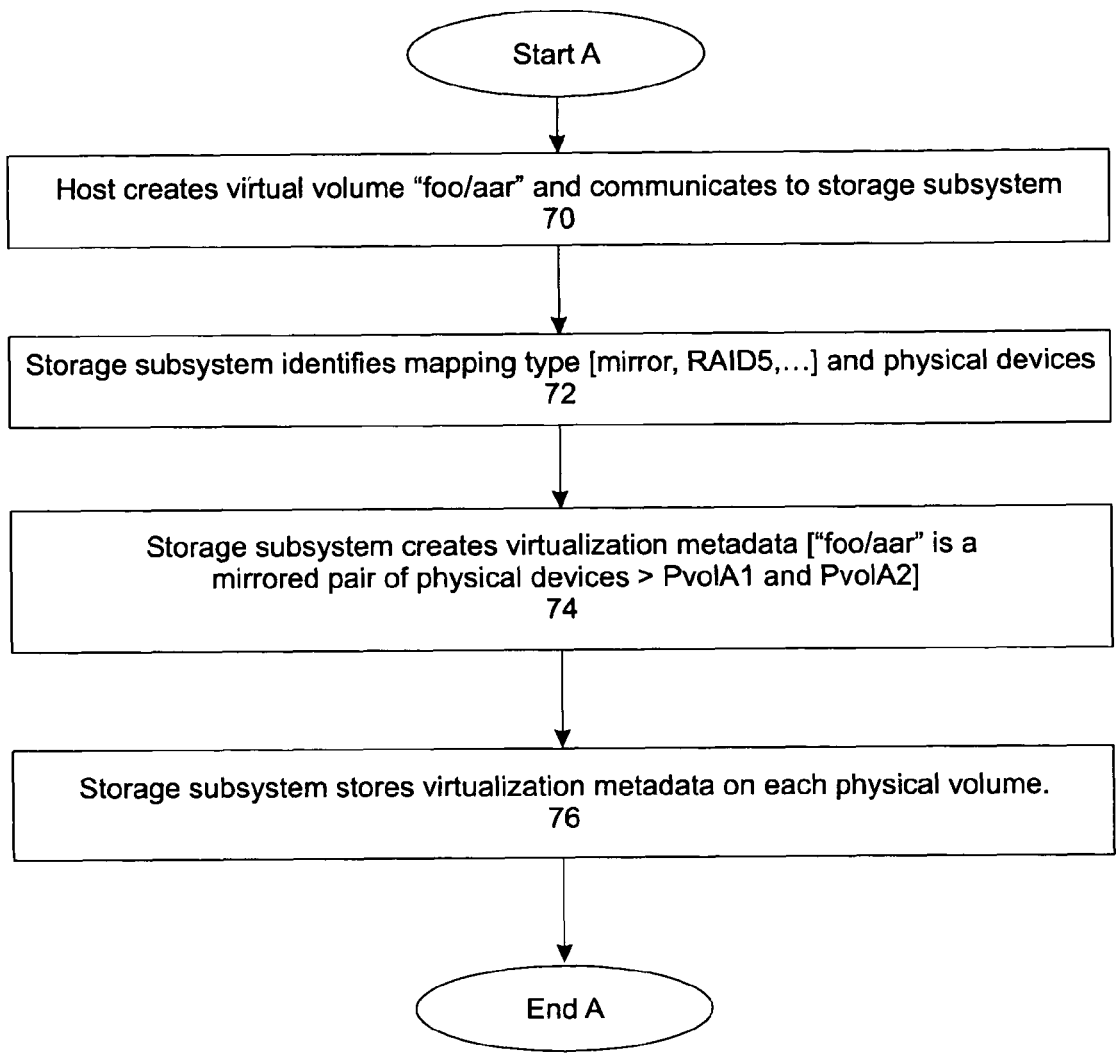
FIG. 4A is a flowchart depicting normal operation of the virtualization storage system of an embodiment of the invention applicable to situations when metadata fails to find a physical device.
Figure 4B:
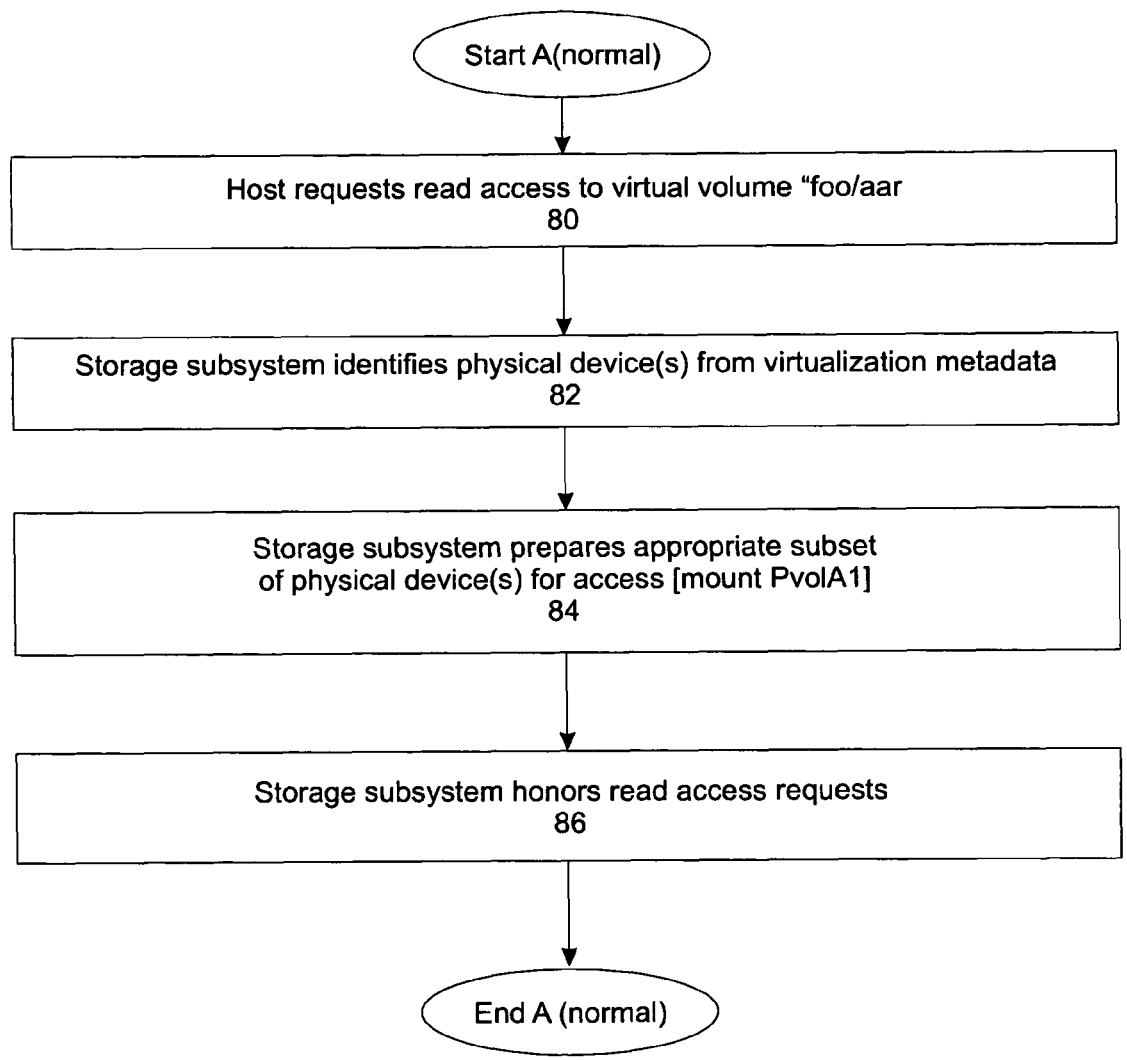
FIG. 4B is a flowchart showing normal operation corresponding to FIG. 4A.
Figure 4C:
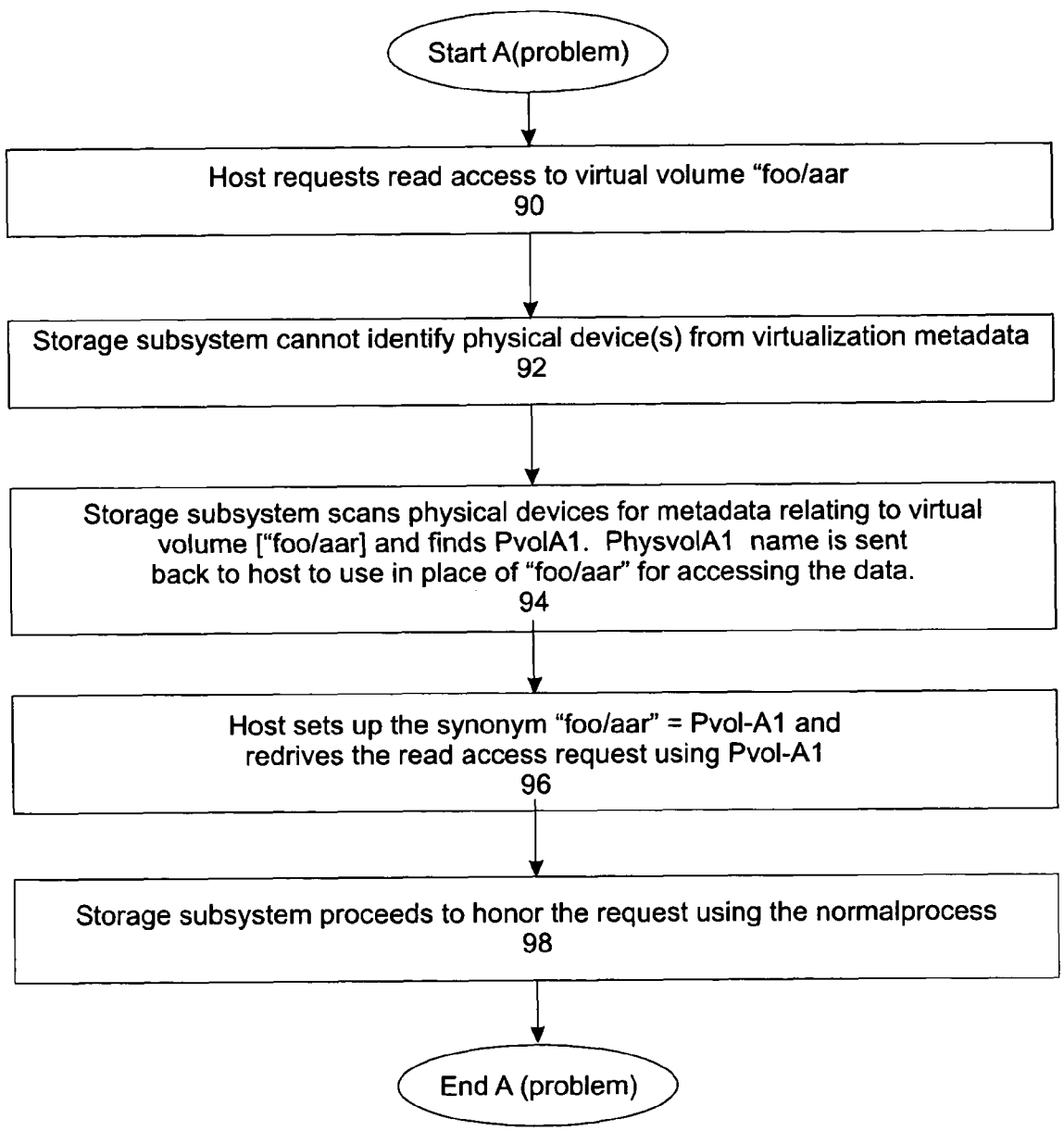
FIG. 4C is a flowchart illustrating the response of the method of the invention when the storage subsystem cannot identify physical devices from virtualization metadata.

With reference to FIGS. 4A, 4B, and 4C, flowcharts illustrating the operation of a virtualization storage system of an embodiment that addresses a failure of virtualization metadata. FIG. 4A is a flowchart illustrating the formation and storage of metadata. In box 70, a host creates virtual volume "foo/aar" and communicates with the storage subsystem. The storage subsystem identifies the mapping type (e.g., mirror, RAIDS, etc) and physical devices (box 72). Next, the storage subsystem creates virtualization metadata (box 74). Finally, the storage subsystem stores virtualization associates the metadata with each physical volume (box 76). This association may be established in the manners set forth above. FIG. 4B provides a flowchart depicting normal operation. In box 80, a host requests read access to virtual volume "foo/aar". The storage subsystem identifies physical devices from the virtualizaton metadata (box 82). The storage subsystem then prepares an appropriate subset of physical devices for access (box 84) and then honors the read access requests (box 86). FIG. 4C provides a flowchart illustrating the response of the method of the invention when the storage subsystem cannot identify physical devices from the virtualization metadata. In box 90, Host requests read access to virtual volume "foo/aar". The storage subsystem is not able to identify physical device (s) from virtualization metadata (box 92). In box 94, the storage subsystem scans physical devices for metadata relating to virtual volume "foo/aar". Upon finding physical device Pvol-A1, the name of physical device Pvol-A1 is sent back to the host to use in place of "foo/aar" for directly accessing requested data when necessary. Next, the host sets up a synonym that equates the virtual volume to a physical device ("foo/aar"=Pvol-A1) (box 96) and re-drives the read access request using the physical device (box 98).

Figure 5A:
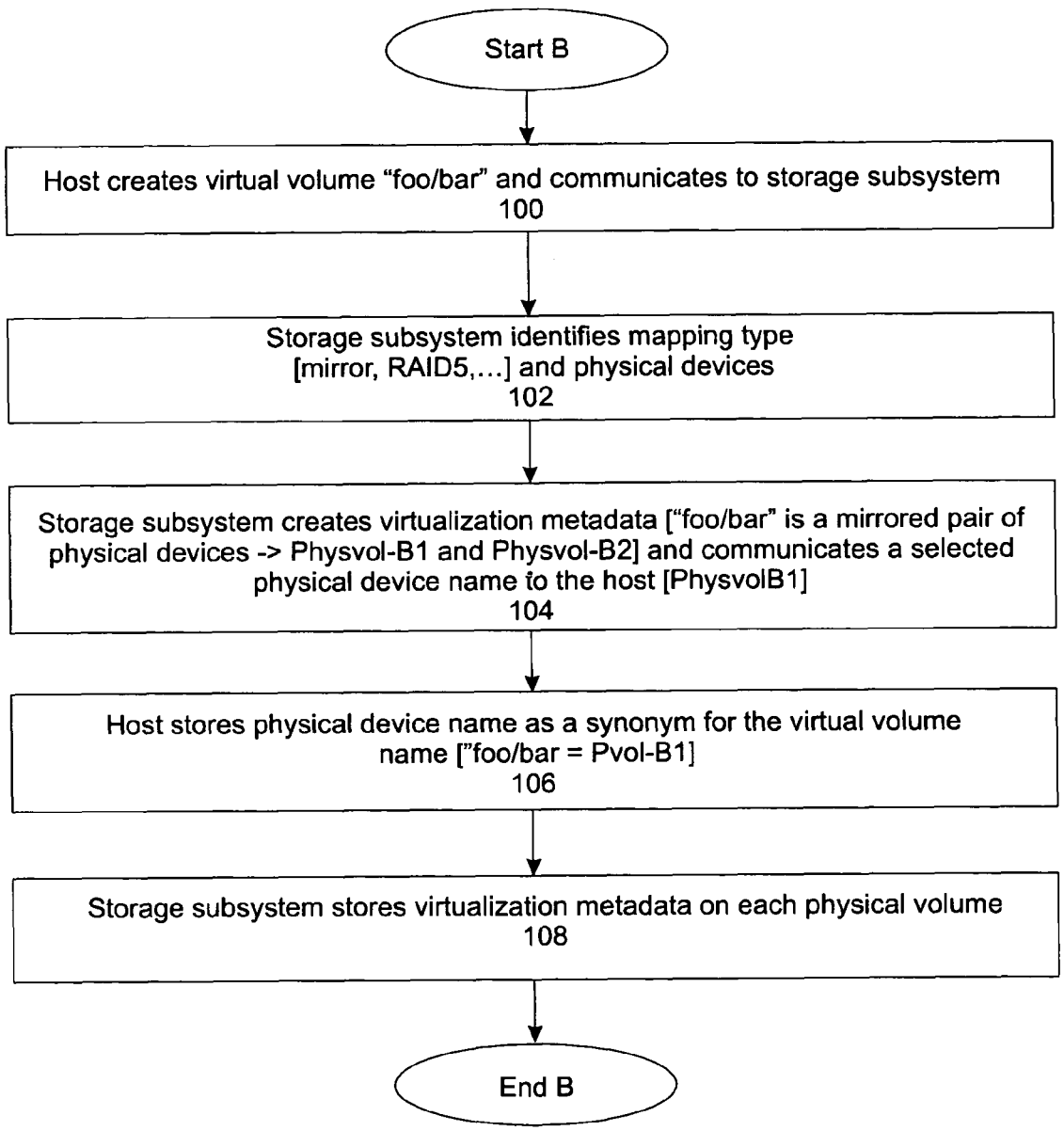
FIG. 5A is a flowchart showing the formation of virtualization metadata applicable to the virtualization of mirrored pairs of physical devices.
Figure 5B:
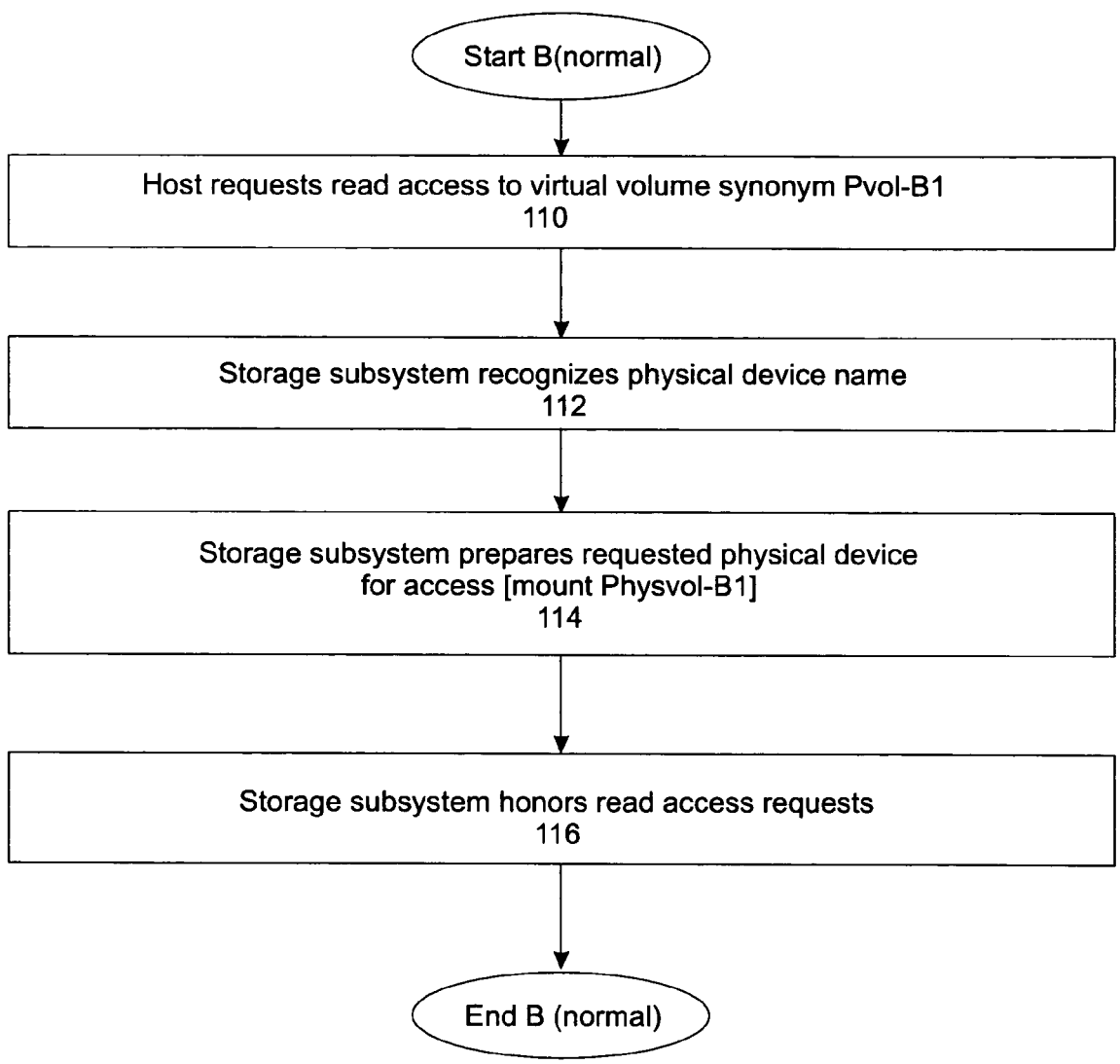
FIG. 5B is a flowchart showing normal operation corresponding to FIG. 5A.
Figure 5C:
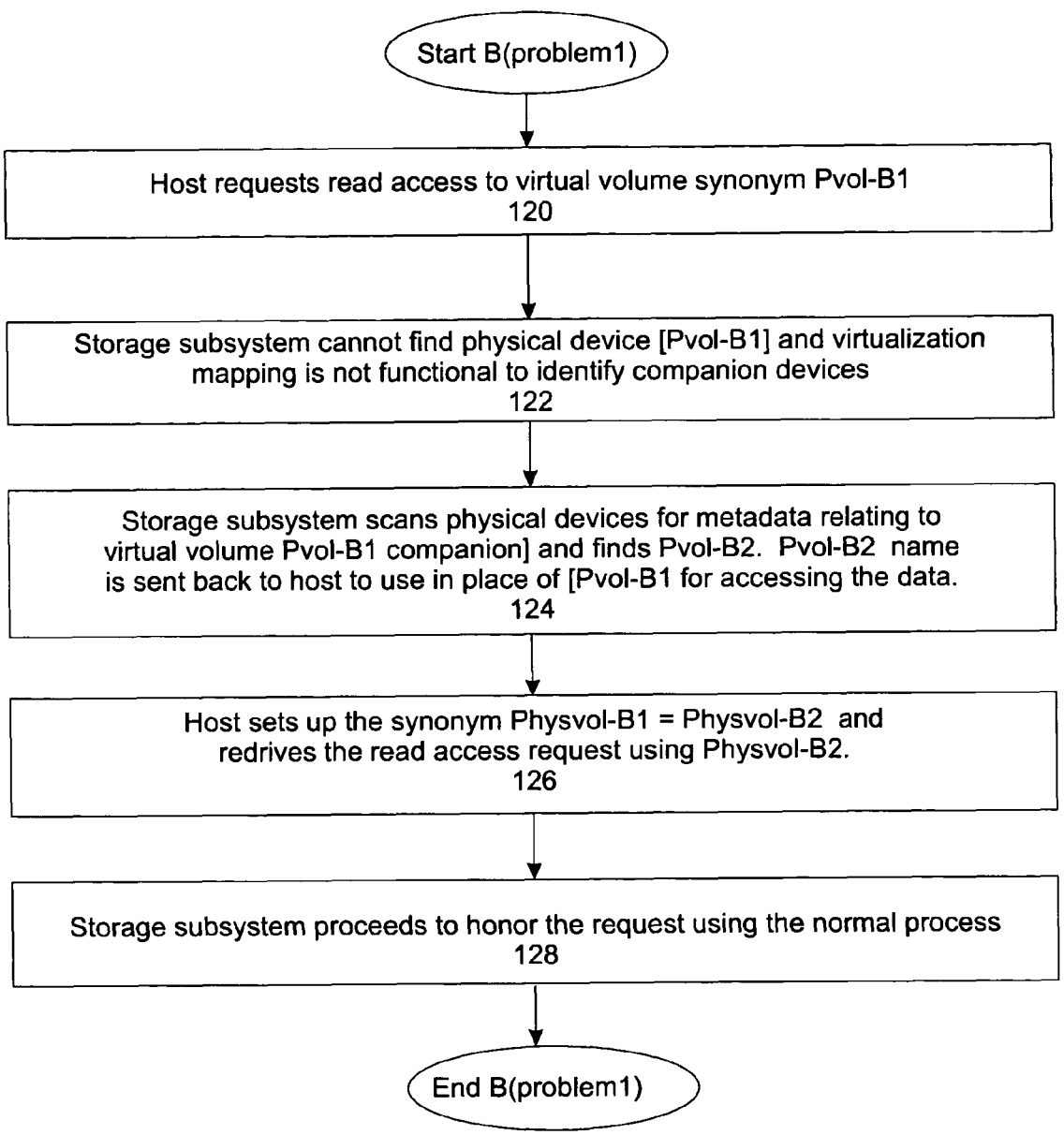
FIG. 5C is a flowchart illustrating a first solution to the situation where the storage subsystem cannot find a physical device and where the virtualization mapping is not functional to identify companion devices.
Figure 5D:
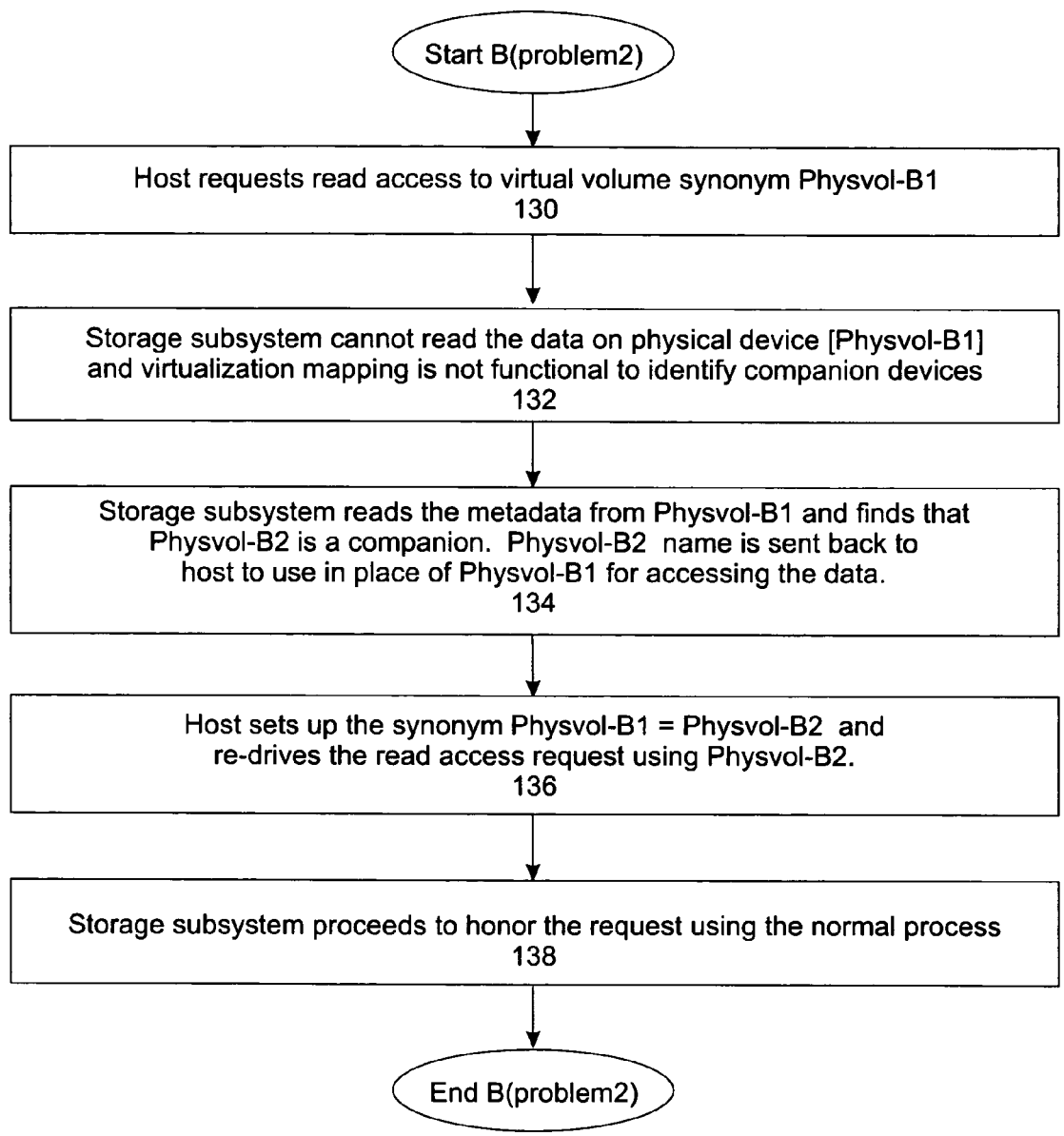
FIG. 5D is a flowchart illustrating a first solution to the situation where the storage subsystem cannot find a physical device and where the virtualization mapping is not functional to identify companion devices.

With reference to FIGS. 5A, 5B, 5C, and 5D, flowcharts explaining another embodiment of the invention applicable to the situation when the storage subsystem in not able to find a physical device. FIG. 5A is a flowchart showing the formation of virtualization metadata in this embodiment. In box 100, a host creates virtual volume "foo/bar" and communicates this to the storage subsystem. The storage subsystem identifies the mapping type (e.g., mirror, RAIDS, etc.) and physical devices (box 102). The storage subsystem creates virtualization metadata (box 104). Next, the host stores physical device name as a synonym for the virtual volume name ("e.g., foo/bar=Pvol-B1) (box 106). Finally, the storage subsystem stores virtualization metadata on each physical volume (box 108). FIG. 5B provides a flowchart depicting normal operation of the present embodiment. In box 110, host creates virtual volume "foo/bar" and communicates this to the storage subsystem. The storage subsystem recognizes the physical device name (box 112) and prepares requested physical device for access (i.e., mount Pvol-B1) (box 114). The storage subsystem then honors the read access requests (box 116). FIG. 5C provides a first solution to the situation where the storage subsystem cannot find a physical device and where the virtualization mapping is not functional to identify companion devices. In box 120, a host requests read access to virtual volume synonym Pvol-B1. In this variation, the storage subsystem cannot find physical device [Pvol-B1] and virtualization mapping is not functional to identify companion devices (box 122). Next, the storage subsystem scans physical devices for metadata relating to virtual volume (e.g., finds Pvol-B2 companion to Pvol-B1). The name of the companion device (Pvol-B2) is sent back to the host to use in place of the device originally being accessed for accessing the data (box 124). The host addresses the problem presented in box 122 by setting up the synonym Pvol-B1=Pvol-B2 and re-drives the read access request using the companion (Pvol-B2) (box 126). Finally, the storage subsystem honors the request normally (box 128). FIG. 5D provides a second solution to the situation where the storage subsystem cannot find a physical device and where the virtualization mapping is not functional to identify companion devices. In box 130, a host requests read access to virtual volume synonym Pvol-B1. The storage subsystem cannot find physical device Pvol-B1 and virtualization mapping is not functional to identify companion devices (box 132). Next, the storage subsystem reads the metadata from Pvol-B1 and finds that Pvol-B2 is a companion. The Pvol-B2 identification (name, location, . . . ) is sent back to host to use in place of Pvol-B1 for accessing the data (box 134). The host addresses the problem presented in box 132 by setting up the synonym Pvol-B1=Pvol-B2 and re-drives the read access request using Pvol-B2 (box 136). Finally, the storage subsystem honors the request normally (box 138).

In the methods set forth above, the storage subsystem identifies and establishes a mapping type between a virtual volume and at least one virtual volume-related physical device. Examples of such mapping types include, but are not limited to, RAID, disk enclosure, mirrors of a storage devices, technology substitution, log structure file virtualization, heap virtualization, managed arrays of individual devices, random arrays of independent tapes, random arrays of independent libraries, local or remote segmentation copies, and combinations thereof.

In still another embodiment of the invention, a virtualization storage system that implements the methods set forth above is provided. The virtualization storage system of this embodiment comprises one or more physical storage devices and a storage subsystem operable to function as set forth above in the descriptions of FIGS. 1-5. For example, the storage subsystem is operable to receive the location of a virtual storage volume to the storage subsystem, identify a mapping type between the virtual volume and a virtual volume-related physical device, create virtualization metadata describing the virtual volume, the mapping type, and the virtual volume-related physical device, store at least a portion of the virtualization metadata on the virtual volume-related physical device as device stored metadata, and provide the virtualization metadata to one or more using systems so that virtual volume information stored therein is updated allowing the using system to make subsequent direct access to the at least one virtual volume related physical device if necessary. Typically, the storage subsystem is further operable to receive a read access request to the virtual volume, identify the virtual volume-related physical device from the virtualization metadata, and preparing the virtual volume-related physical device for access. In a variation, the virtualization storage system is further operable to scan the one or more physical storage devices for the device stored metadata to identify the virtual volume-related physical device corresponding to the virtual volume and relate the virtual volume-related physical device identified in step k) to the virtual volume. In other variations, the virtualization storage system is further operable to communicate an identifier for the virtual volume-related physical device to the host. In this variation, the host stores the identifier as a synonym for the virtual volume. In still other variations, the virtualization storage system is further operable to scan the one or more physical storage devices for the device stored metadata to identify the virtual volume-related physical device corresponding to the virtual volume and relate the virtual volume-related physical device to the virtual volume.

In variations of the invention, the methods set forth above are executed by one or more computer systems with associated metadata described above being stored on a digital storage medium. Such computer systems include, for example, servers and microprocessor based systems.

While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention.

What is claimed is:

1. A method for storing digital data in a virtualization storage system having one or more using systems having virtual volume mappings, a storage subsystem, and one or more physical storage devices, the method comprising:
   a) creating a virtual storage volume;
   b) communicating the location of the virtual storage volume to the storage subsystem;
   c) identifying a mapping type between the virtual volume and at least one virtual volume-related physical device;
   d) creating virtualization metadata describing the virtual volume, the mapping type, and the virtual volume-related physical device; and
   e) associating at least a portion of the virtualization metadata with the virtual volume-related physical device;
   f) providing at least a portion of the stored virtualization metadata to the using system; and
   g) updating virtual volume information in the using system such that the using system responds to a request for specified data stored by allowing the using system to access the specified data that was originally requested by direct access to the at least one virtual volume related physical device if the storage subsystem is unable to identify the virtual volume-related physical device as a result of a failure of the virtual volume.

2. The method of claim 1 further comprising:
   h) receiving a read access request to the virtual volume;
   i) identifying the virtual volume-related physical device from the virtualization metadata;
   j) preparing the virtual volume-related physical device identified in step h) for access; and
   k) honoring the read access request.

3. The method of claim 2 wherein if the virtual volume-related physical device cannot be identified in step i) the using system makes direct access to the at least one virtual volume related device using the virtual volume information stored thereon.

4. The method of claim 3 wherein the virtualization metadata provided in step f is found by:
   l) scanning the one or more physical storage devices for the device stored metadata to identify the virtual volume-related physical device corresponding to the virtual volume;
   m) relating the virtual volume-related physical device identified in step l) to the virtual volume.

5. The method of claim 3 wherein if the virtual volume-related physical device cannot be identified in step i), the using systems make direct access to the virtual volume-related physical device.

6. The method of claim 1 wherein the mapping type is a RAID, a disk enclosure, a mirror of a storage devices, technology substitution, log structure file virtualization, heap virtualization, managed array of individual devices, random array of independent tapes, random array of independent libraries, local or remote segmentation copies, and combinations thereof.

7. The method of claim 1 wherein the virtualization data is stored within the storage subsystem.

8. The method of claim 1 wherein the storage subsystem is a system selected from the group consisting of disk virtualization systems, tape virtualization systems, multilevel hierarchy systems using disk, disk and tape, disk and optical disk, or any combination of disk, tape, optical, magneto-optical, holographic, solid state, nano-devices, or multi-media storage, systems using automated libraries of devices and-or storage media, non-automated management systems using removable media and devices sent to remote locations, and combinations thereof.

9. A virtualization storage system comprising:
one or more physical storage devices;
a storage subsystem operable to;
receive the location of a virtual storage volume to the storage subsystem;
identify a mapping type between the virtual volume and a virtual volume-related physical device;
create virtualization metadata describing the virtual volume, the mapping type, and the virtual volume-related physical device;
store at least a portion of the virtualization metadata on the virtual volume-related physical device as device stored metadata; and
provide the virtualization metadata to one or more using systems so that virtual volume information stored therein is updated allowing the using system to make subsequent direct access to the at least one virtual volume related physical device as a solution to the failure of a virtual volume.

10. The virtualization storage system of claim 9 wherein the storage subsystem is further operable to:
receive a read access request to the virtual volume;
identify the virtual volume-related physical device from the virtualization metadata; and
preparing the virtual volume-related physical device for access.

11. The virtualization storage system of claim 9 wherein the storage subsystem is further operable to:
scan the one or more physical storage devices for the device stored metadata to identify the virtual volume-related physical device corresponding to the virtual volume; and
relate the virtual volume-related physical device identified in step k) to the virtual volume.

12. The virtualization storage system of claim 9 wherein the storage subsystem is further operable to:
communicate an identifier for the virtual volume-related physical device to the host, wherein the host stores the identifier as a synonym for the virtual volume.

13. The virtualization storage system of claim 12 wherein the storage subsystem is further operable to:
scan the one or more physical storage devices for the device stored metadata to identify the virtual volume-related physical device corresponding to the virtual volume; and
relate the virtual volume-related physical device to the virtual volume.

14. A method for a using system to access, via a storage subsystem, data stored in a virtualized storage system having virtualization metadata to map a virtual storage volume to one or more physical storage devices, the method comprising:
scanning the one or more physical storage devices for virtualization metadata relating to a requested virtual volume in response to the storage subsystem being unable to identify one or more physical storage devices from the virtualization metadata associated with a requested virtual volume identified by the storage subsystem in response to a request from the using system for data access;
communicating an identifier for the physical storage device containing the virtualization metadata to the using system for subsequent direct access to the physical storage device by the using system.

15. The method of claim 14 further comprising:
storing at least a portion of the virtualization metadata on the one or more physical storage devices prior to scanning.

16. The method of claim 14 wherein communicating an identifier comprises:
identifying a companion physical device associated with the one or more physical devices containing the virtualization metadata; and
communicating an identifier that identifies the companion physical device to the using system.

17. The method of claim 16 further comprising:
directly accessing the companion physical device from the using system via the identifier.

18. The method of claim 14 further comprising:
generating a synonym equating the virtual volume to the physical storage device containing the virtualization metadata based on the identifier for subsequent direct access to the physical storage device in response to a request for data from the virtual volume.

* * * * *